April 6, 1954  C. H. STEVENSON  2,674,639
METHOD OF AND A FURNACE FOR INDUCTION MELTING METAL
Filed March 13, 1952
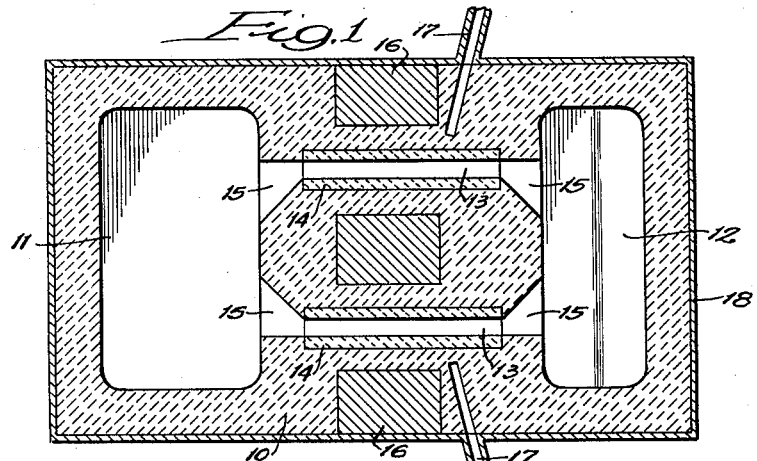
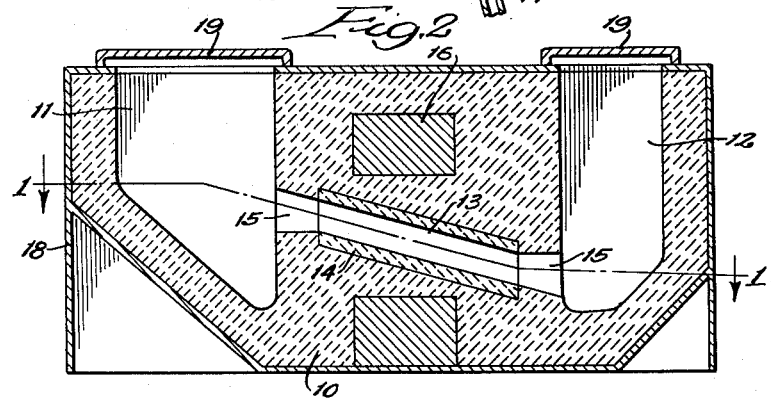
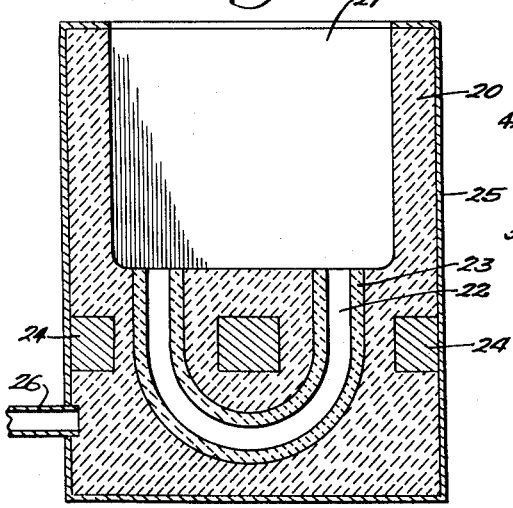
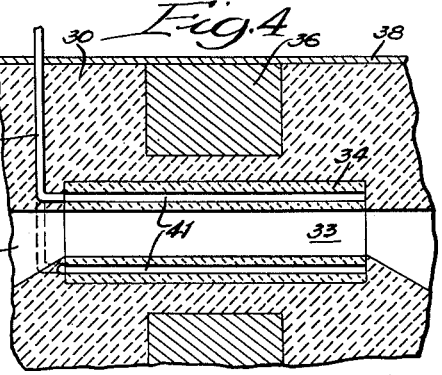
INVENTOR.
Cary H. Stevenson,
BY
E. A. Borth,
ATTORNEY.

Patented Apr. 6, 1954

2,674,639

UNITED STATES PATENT OFFICE 2,674,639

METHOD OF AND A FURNACE FOR INDUCTION MELTING METAL

Cary H. Stevenson, Chicago, Ill., assignor to Lindberg Engineering Company, Chicago, Ill., a corporation of Illinois Application March 13, 1952, Serial No. 276,367

18 Claims. (Cl. 13—29)

This invention relates to a method of and a furnace for induction melting metal and more particularly to the electric induction melting of metal in a submerged channel type of furnace.

Submerged channel induction furnaces have been used for many years to melt various different metals. One type of such furnaces is the vertical single chamber type in which a looped channel communicates with the lower part of a chamber and is threaded by an electric induction unit to induce heating current in the metal in the channel. Another type is the double chamber type in which two horizontally spaced chambers are connected by submerged channels and an induction unit threads the channels to induce heating current in the metal therein.

One of the major problems encountered in all of such furnaces, and particularly when melting light metals such as aluminum or magnesium, is the formation of slag or dross which is largely oxides and which may actually clog the channels and prevent operation of the furnace. With metals such as brass oxygen reacts primarily with the zinc and may change the makeup of the alloy. With ferrous metals, oxygen reacts with the carbon to change the desired carbon content as well as to produce slag or dross.

Oxidation at the surface of the furnace chambers can be controlled by designing and operating the furnace so that the surface oxide film will not be broken. It has been found, however, that oxides are formed in the submerged melting channels themselves so that prevention of surface oxidation is only a partial answer to the problem.

In these furnaces the channels and chambers must be formed of a nonconducting material which will withstand the molten metal, for which purpose a refractory ceramic material is used. Such materials have been found to be pervious to gas even when densely compacted and finished to a smooth surface. During operation of the furnaces a so called pinch effect is produced which tends to force the molten metal outward in both directions from the central part of the channel. It is believed that this effect creates a partial vacuum in the channel which draws air in through the porous ceramic walls thereof to produce oxidation of the metal in the channels.

It is a primary object of the present invention to provide a metal melting method and furnace in which oxidation of metal in the metal channels is prevented.

Another object is to provide a metal melting method and furnace in which an inert or fluxing gas is introduced into the channels during operation.

A further object is to provide a metal melting method and furnace in which the partial vacuum produced in the channels during operation is utilized to draw an inert gas through the porous channel walls and into the channels.

The above and other objects and advantages of the invention will be more readily apparent when viewed in connection with the accompanying drawings in which:

Figure 1 is a horizontal section on the line I—I of Figure 2 showing a double chamber furnace embodying the invention;

Figure 2 is a vertical section;

Figure 3 is a vertical section of an alternative type of furnace embodying the invention; and Figure 4 is an enlarged partial section similar to Figure 1 of a further alternative construction.

Figures 1 and 2 illustrate a double chamber furnace which is generally of the type more particularly described and claimed in the copending application of Karl A. Lang, Serial No. 159,047, filed April 29, 1950. This furnace comprises a body 10 of ceramic refractory material which is formed with horizontally spaced open topped chambers 11 and 12. The chambers are connected by submerged channels 13 which may be formed directly in the ceramic body 10, but which preferably are formed by separate precast ceramic tubes 14 set into the ceramic body 10. At the ends where the channels 13 connect with the chambers they are flared as indicated at 15 in the manner more particularly described and claimed in the copending Lang application, to minimize surface turbulence in the chambers. The channels are threaded by an electric induction unit including a magnetic core 16 having end legs lying beyond the sides of the channels and a center leg extending vertically between the channels with the legs being connected by top and bottom horizontal portions. The core carries one or more windings not shown to energize the induction unit thereby to induce melting current in the metal in the channels 13 and in the chambers. The induction unit is positioned so that its magnetic center lies between the ends of the channels whereby the major portion of the heating effect will occur in the channels themselves.

With this type of furnace, a so called pinch effect occurs in the central portions of the channels generally in register with the magnetic center of the induction unit. This effect causes the metal in the channels to be forced away from the central portion thereof in both directions thereby tending to create a void in the centers of the channels. The ceramic material 10 and the ceramic material of which the tubes 14 are formed is pervious to air so that in normal operation of the furnace as so far described air tends to seep through the ceramic material and the channel walls into the channels themselves to cause oxidation of the metal therein. The temperature and movement of the metal are at their maximum values near the centers of the channels so that admission of air at this point causes a very rapid oxidation and causes objectionable slag or dross to be formed in the channels. This slag or dross tends to cling to the channel walls and may eventually block the channels completely so that the furnace becomes inoperative.

According to the present invention, this effect is eliminated by supplying an inert or fluxing gas to the channels during operation. For this purpose in the furnace shown in Figures 1 and 2, gas connections 17 extend into the ceramic body 10 as for example by providing cored openings therein and terminate at a point adjacent to the channels. Preferably the ceramic body 10 is enclosed in a steel covering 18 which will prevent excessive flow of the inert gas from the ceramic body and which also strengthens and supports the furnace structure. If desired the chambers 11 and 12 may be closed by covers 19 to limit escape of inert gasses, although this is not essential. Preferably, the gas is supplied at a relatively low pressure and will seep or flow through the ceramic body to envelope the tubes 14 throughout. Thus, when a partial vacuum is produced in the channels, the inert gas will flow through the walls of the tubes 13 into the channels to mix with the metal.

In addition to preventing oxidation of the metal in the channels, a gas may be employed which has a fluxing effect or a degassifying effect on the metal. When aluminum or magnesium or alloys thereof are being melted either nitrogen or chlorine or a mixture thereof is preferred, since these gasses are not only inert to the metal but have a desirable fluxing effect thereon. When brass is being melted the same gasses may be employed or a mixture of hydrogen with nitrogen or chlorine may be employed. When steel is being melted, hydrogen is preferred because of its degassifying effect, although any gas which is inert to metal will provide greatly improved operation.

Figure 3 illustrates application of the invention to a vertical single chamber type furnace which includes a ceramic body 20 formed at its top with an open chamber 21. A looped channel 22 is provided in the bottom part of the body and may be formed by coring out the ceramic material 20 or by utilizing a separate precast curved tube 23 which is embedded in the ceramic material 20. The looped channel 23 is threaded by an induction unit including a core 24 similar to the core 16 of Figure 1 and which carries an energizing winding not shown. The ceramic body 20 may be enclosed in a metal covering 25 similar to the covering 18 of Figure 1.

Inert gas is introduced into the ceramic body through a gas connection 26 extending through the covering 25 and into the ceramic body. Gas introduced through the connection 26 will flow through the ceramic body to envelope the tube 23 and will be drawn into the channel 22 by the pinch effect created during operation of the furnace.

Figure 4 shows a construction in which the gas is conducted directly to the tubes themselves, parts therein corresponding to like parts in Figures 1 and 2 being indicated by the same reference numerals plus 20. In this construction the refractory tubes 34 are formed with one or more small passages 41 in their walls and a gas supply pipe 42 extends through the body 30 and connects with the ends of the passages 41. The pipe 42 may be formed of metal but is preferably of a non-conducting material such as ceramic or plastic to eliminate induced currents therein.

In operation an inert or fluxing gas is forced through the pipe 42 and into the passages 41 from which it will quickly permeate the tubes 34 and will flow therethrough into the channels 33. With this construction the gas is delivered substantially at the point of use so that the entire refractory body need not be filled with gas and so that the possibility of any air held in the refractory material entering the channels is minimized.

In all types of furnaces introduction of an inert or fluxing gas in the manner defined, not only maintains the purity of the metal at a very high degree, but also minimizes the formation of slag or dross in the channels which might interfere with operation of the furnace. While the invention has very great advantages for use with any type of metal, it is especially advantageous with the lighter metals whose oxides do not separate readily therefrom.

While several embodiments of the invention have been shown and described in detail it will be understood that these are illustrative only and are not to be taken as a definition of the scope of the invention, reference being had for this purpose to the appended claims.

What is claimed is:

1. In a method of melting metal in an electric induction furnace of the type having a chamber open to atmosphere a melting channel communicating with the lower part of the chamber and an electric induction unit magnetically associated with the channel to induce heating current in the metal in the channel and arranged with its magnetic center intermediate the ends of the channel, the step of introducing an inert gas into the channel adjacent to the magnetic center of the induction unit.

2. In a method of melting metal in an electric induction furnace of the type having a chamber open to atmosphere a melting channel communicating with the lower part of the chamber and an electric induction unit magnetically associated with the channel to induce heating current in the metal in the channel and arranged with its magnetic center intermediate the ends of the channel, the step of introducing into the channels adjacent to the magnetic center of the induction unit a gas selected from the group consisting of nitrogen, chlorine and hydrogen.

3. In a method of melting metal in an electric induction furnace of the type having a chamber open to atmosphere a melting channel communicating with the lower part of the chamber defined by refractory walls which are porous to gas and an electric induction unit magnetically associated with the channel to induce heating current in the metal in the channel and arranged with its magnetic center intermediate the ends of the channel, the step of enveloping the porous channel in an inert gas so that vacuum produced by pinch effect on the metal in the channel will draw the inert gas through the porous channel wall and into the metal in the channel.

4. The method of claim 3 in which the gas is selected from the group consisting of nitrogen, chlorine and hydrogen.

5. An induction metal melting furnace comprising a chamber to hold molten metal an elongated tubular melting channel communicating with the chamber and formed with a wall portion which is pervious to gas, an electric induction unit extending around the channel intermediate the ends of the channel to induce heating current in the metal in the channel, and a gas connection to conduct an inert gas to the pervious wall portion of the channel to flow therethrough into the metal in the channel.

6. An induction metal melting furnace comprising a chamber to hold molten metal an elongated tubular melting channel communicating with the chamber and formed with a wall portion which is pervious to gas, an electric induction unit extending around the channel intermediate the ends of the channel to induce heating current in the metal in the channel, a ceramic material porous to gas around the pervious wall portion of the channel, and a gas connection to conduct an inert gas to the ceramic material to flow therethrough and through the walls of the channel into the metal in the channel.

7. An induction metal melting furnace comprising a body formed of ceramic material defining a chamber to hold molten metal, means defining a melting channel communicating with the chamber and having a gas pervious wall portion, an electric induction unit around the channel intermediate the ends thereof to induce heating current in the metal in the channel, and a gas connection to conduct inert gas to the pervious wall portion of the channel to flow therethrough into the metal in the channel.

8. An induction metal melting furnace comprising a body formed of ceramic material defining a chamber to hold molten metal, means defining a melting channel communicating with the chamber and having a gas pervious wall portion, an electric induction unit around the channel intermediate the ends thereof to induce heating current in the metal in the channel, the ceramic material being pervious to gas, and means to supply an inert gas to the ceramic material to flow therethrough and through the pervious channel wall portion into the channel.

9. An induction metal melting furnace comprising a body formed of ceramic material defining a chamber to hold molten metal, means defining a melting channel communicating with the chamber and having a gas pervious wall portion, an electric induction unit around the channel intermediate the ends thereof to induce heating current in the metal in the channel, a gas impervious covering over the ceramic material, the ceramic material being gas pervious, and a connection to the interior of the covering to supply inert gas thereto to flow through the ceramic material and through the pervious wall portion into the channel.

10. An induction metal melting furnace comprising a body formed of gas pervious ceramic material defining a chamber to hold molten metal, a tube of ceramic material which is pervious to gas defining a melting channel communicating with the chamber, an electric induction unit around the tube intermediate the ends thereof to induce heating current in the metal in the channel, and means to conduct an inert gas through the ceramic material to the tube to flow through the porous wall of the tube and into the channel.

11. An induction metal melting furnace comprising a body formed of gas pervious ceramic material defining a chamber to hold molten metal, a tube of ceramic material which is pervious to gas defining a melting channel communicating with the chamber, an electric induction unit around the tube intermediate the ends thereof to induce heating current in the metal in the channel, a gas impervious covering over the body of ceramic material, and a connection to the interior of the covering to supply inert gas thereto to flow through the ceramic material and the wall of the tube into the channel.

12. An induction metal melting furnace comprising a gas pervious ceramic body formed with a pair of horizontally spaced chambers to hold molten metal, a plurality of melting channels having gas pervious ceramic walls connecting the chambers below the normal level of molten metal therein, an electric induction unit threading the channels intermediate the ends thereof to induce heating current in the metal in the channels, and a gas connection to conduct an inert gas to the melting channels to flow through the pervious walls thereof into the metal in the channels.

13. An induction metal melting furnace comprising a gas pervious ceramic body formed with a pair of horizontally spaced chambers to hold molten metal, a plurality of melting channels having gas pervious ceramic walls connecting the chambers below the normal level of molten metal therein, an electric induction unit threading the channels intermediate the ends thereof to induce heating current in the metal in the channels, a gas impervious covering over the ceramic body, and a gas connection extending through the covering to supply an inert gas to the ceramic body to flow through the porous ceramic material and into the channels.

14. An induction metal melting furnace comprising a body defining an open topped chamber adapted to hold molten metal, a looped channel having gas pervious ceramic walls communicating at its ends with the lower part of the chamber, an electric induction unit threading the looped channel to induce heating current in metal in the channel, and a gas connection to a point adjacent to the looped channel to supply an inert gas thereto.

15. An induction metal melting furnace comprising a body defining an open topped chamber adapted to hold molten metal, a looped channel having gas pervious ceramic walls communicating at its ends with the lower part of the chamber, the looped channel being enclosed by porous ceramic material, an electric induction unit threading the looped channel to induce heating current in the metal therein, and a gas connection to the ceramic material to supply an inert gas to flow through the ceramic material and into the channel.

16. An induction metal melting furnace comprising a chamber to hold molten metal, an elongated tubular melting channel communicating with the chamber and formed with a wall portion which is pervious to gas, an electric induction unit extending around the channel intermediate the ends of the channel to induce heating current in the metal in the channel, means defining a gas passage adjacent to the pervious wall portion of the channel, and a supply conduit for an inert gas communicating with the gas passage.

17. An induction metal melting furnace comprising a chamber to hold molten metal, an elongated tubular melting channel communicating with the chamber and formed with a wall portion which is pervious to gas, an electric induction unit extending around the channel intermediate the ends of the channel to induce heating current in the metal in the channel, means defining a gas passage lying parallel and closely adjacent to the channel and in fluid communication with the porous wall portion, and a supply conduit for an inert gas communicating with the gas passage.

18. An induction metal melting furnace comprising a body of refractory material formed with a chamber to hold molten metal, a tube of refractory material enclosed in the body and communicating with the chamber, the tube having a gas pervious wall portion and being formed in its wall with a gas passage in fluid communication with the pervious wall portion, an electric induction unit around the tube intermediate the ends thereof to induce heating current in the metal in the tube, and a supply conduit for an inert gas communicating with the gas passage.

References Cited in the file of this patent

UNITED STATES PATENTS

| Number | Name | Date |
|---|---|---|
| 428,552 | Colby | May 20, 1890 |
| 1,152,586 | Wright | Sept. 7, 1915 |
| 1,763,248 | Moore | June 10, 1930 |
| 2,494,501 | Bahney et al. | Jan. 10, 1950 |
| 2,589,301 | Smith | Mar. 18, 1952 |